United States Patent Office 3,721,575
Patented Mar. 20, 1973

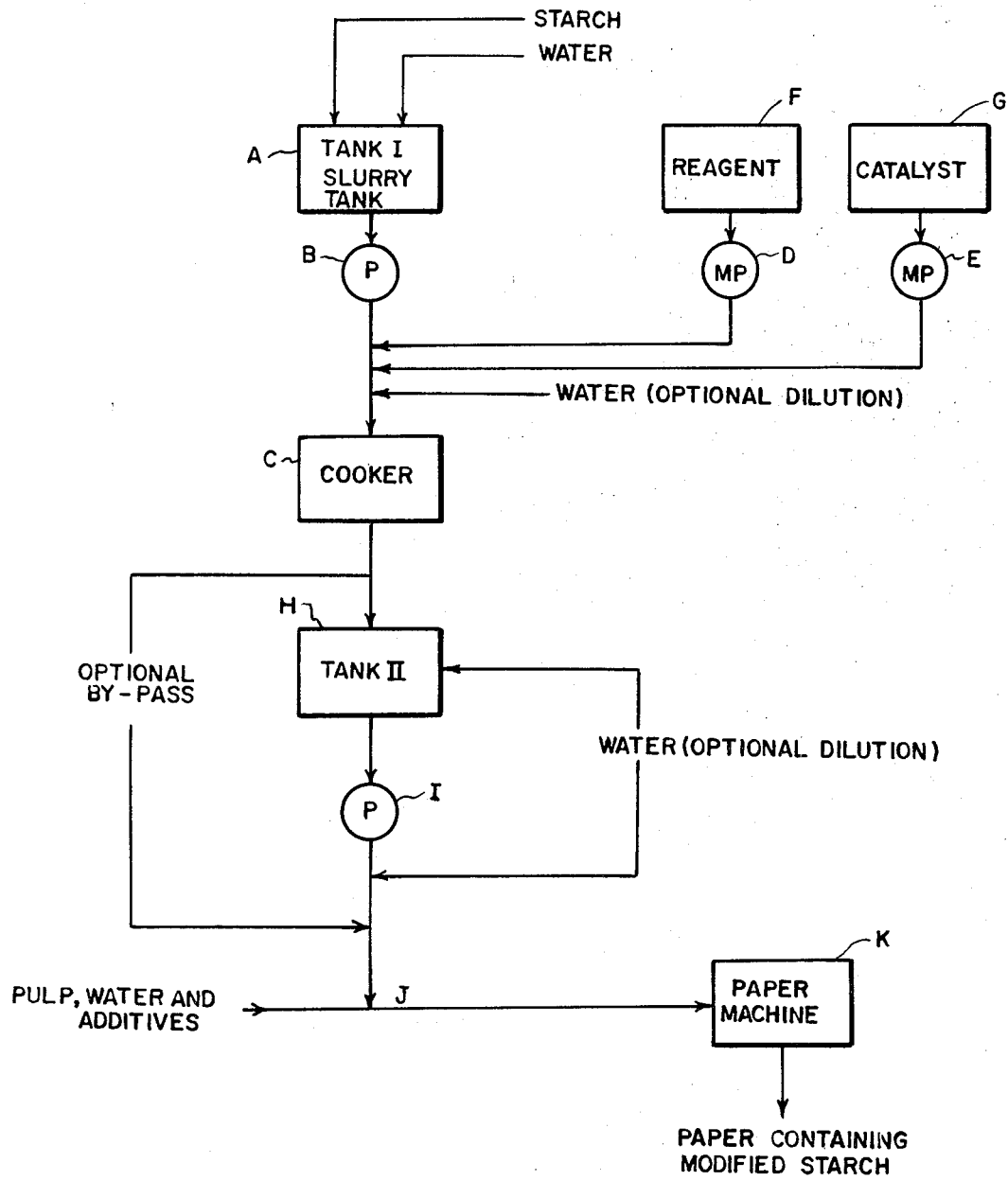

3,721,575
CONTINUOUS PROCESS FOR THE PREPARATION OF MODIFIED STARCH DISPERSIONS
Wadym Jarowenko, Plainfield, N.J., assignor to National Starch and Chemical Corporation, New York, N.Y.
Filed Jan. 5, 1971, Ser. No. 103,989
Int. Cl. C08b 25/02
U.S. Cl. 106—213                              7 Claims

ABSTRACT OF THE DISCLOSURE

A process for preparing dispersions of modified starches containing cationic groups which comprises continuously and simultaneously gelatinizing and reacting a starch with a monofunctional cationogenic reagent in an aqueous reaction medium having a pH of 8 or higher at a temperature of at least 100° C. The derivatized starch products are conveniently utilized at the site of their preparation as, for example, wherein the products are added directly to the furnish or pulp during paper manufacture.

Modified starches have long been used as additives in a variety of industrial applications including the manufacture of paper wherein, for example, a starch containing cationic substituent groups enhances pigment retention as well as improves the strength of the resultant paper. Previously, these cationic starches had to be separately prepared according to non-continuous, time-consuming batch processes. After washing and drying, the resultant modified starch was subsequently dispersed by cooking (usually at temperatures of from about 212 to 320° F. for periods of 1 to 30 minutes) and thereafter these starch dispersions were added to the furnish or paper utilized in the paper making process.

It has now been found, according to this invention, that dispersions of modified starches containing cationic groups can be prepared in situ by means of a continuous cooker process utilizing specified, controlled conditions and selected monofunctional reagents as later described. The term "modified starch dispersions" as comprehended herein designates aqueous dispersions of starches containing cationic substituent groups which have been prepared by the reaction of native or previously treated starch with selected monofunctional reagents. Also to be comprehended within the meaning of the term are dispersions of modified starches which, in addition to containing cationic substituent groups, also contain anionic substituent groups and are prepared by reacting starches containing anionic substituent groups with the selected monofunctional reagents.

It will be seen that the continuous cooker process for the preparation of the modified starch dispersions of this invention eliminates a number of separate steps which previously had been required for their preparation and use in paper manufacture. Thus, instead of employing modified starches such as those already bearing cationic substituent groups for such purposes, native starches can be used. By means of the continuous cooker process of my invention, the cooking and derivatization of starch take place simultaneously and almost instantaneously. My process provides a condensation of many steps of prior art procedures into the single step of cooking-modification and has obvious economical advantages. It is no longer necessary (a) to separately react a base starch with a cation-bearing reagent and wash, recover and dry the resultant modified starch product, and (b) to thereafter disperse the modified starch prior to its addition to the pulp.

Related prior art processes are well described in the starch literature and in many patents, and involved reactions in which native starches are brought in contact with catalysts and cationogenic reagents (i.e. reagents capable of introducing cationic groups into starch) for periods of time up to 16 hours. It has now been found surprisingly that numerous starch derivatives can be readily prepared by means of a continuous process, under conditions to be later described, such reactions requiring, with respect to time, only fractions of a minute as contrasted to the hours required by the prior art batch response. It was completely unexpected that these products could be prepared in so short a period of time and in relatively high dilutions.

In accordance with the process of my invention, a slurry may first be formed of the uncooked starch, water and selected reagents, and sufficient alkali is added, if necessary, to bring the pH of the slurry, i.e. the reaction medium, to about 8.0 or higher, throughout the course of the reaction. The alkali acts as catalyst and acid acceptor, and the degree of alkalinity required in a particular reaction will depend on such factors as the reagent used in the reaction and the stability of the resulting product. For example, a reaction which is run with trimethylglycidyl ammonium hydroxide will require less alkali than a reaction run with betadiethylaminoethyl-chloride hydrochloride. It is to be noted that the actual sequence employed in combining the various ingredients in preparing the slurry which is passed through the continuous cooker is of no serious consequence. Variations thereof and specific process conditions are more fully illustrated in the examples hereinbelow. This slurry is then passed through a continuous cooker. The term "continuous cooker" refers to a type of closed-system equipment well known in the starch processing field and comprises equipment through which a starch slurry is passed on a continuous basis. When used to prepare the starch derivatives of my invention, the continuous cooker provides the means of subjecting the slurry to heat of from about 100 to 160° C. usually in the form of injected, live steam, so that the starch is discharged in a gelatinized ("cooked") state. The continuous cooker process results in essentially simultaneous gelatinization of the starch and its reaction with the selected reagent to introduce the cationic substituent groups. The continuous cooker process enables the practitioner to prepare the starch product at the site of its eventual utilization and thus have a continuous flow of product for immediate use.

In the drawing, the flow diagram illustrates the on site preparation of the starch and its use in the formation of paper sheet.

The starches which comprise the base material for the reaction with the monofunctional reagent may be used in their original native form or even in modified form such as obtained by controlled degradation (thermal, acidic or oxidative), etherification and/or esterification, provided that they are still capable of further derivatization into cationic derivatives of the type described hereinbelow. Thus, starches which have been derivatized with phosphate ester groups can readily be used herein provided they still retain reactive sites. These starch bases may be derived from any sources including corn, high amylose corn, wheat, potato, tapioca, waxy maize, sago or rice, as well as from the amylose and amylopectin fractions of starch. The use of the term "starch" is thus intended to include any amylaceous substances, whether modified or unmodified, which still retain free hydroxyl groups. These amylaceous materials may be in granular form or in cold water swelling form as, for example, pregelatinized starches and dextrins. The starch base selected for the preparation of the modified starch dispersions will largely depend on the intended end-use of the final product.

In a typical paper making process, a slurry of pulp is fed into a beater through continuous refiners where it is subjected to mechanical beating until it acquires the desired fiber length and degree of hydration. Pigments and other ingredients such as rosin, alum, dyes, etc. may be added before, during or after the latter processing step and the slurry (i.e. paper stock) is thereupon diluted to the desired solids content. The derivatized starch dispersions of this invention may be added to the pulp slurry either before or after the other ingredients have been incorporated therein. Ordinarily, these dispersions may be employed in concentrations of from about 0.1 to about 0.5%, by weight, based on the solids content of the cationic starch dispersion with respect to the dry weight of the dispersed pulp. Where economics of a particular situation permit, the dispersions may be employed in concentrations exceeding 0.5%, by weight, for purposes of greater performance improvement. The dispersion may be added to the pulp slurry at its existing alkaline pH or its pH may be adjusted prior to such addition, if desired, to a pH as low as about pH 3. The resulting pulp slurry is then passed onto a moving wire belt or onto a revolving screen-covered cylinder where a self-supporting web is thereby formed. This web is then pressed to further reduce its water content and, after pressing, the paper sheet is dried by means of its being carried over a series of steam-heated cylinder driers.

The following examples will further illustrate the embodiment of the invention. In these examples, all parts given are by weight unless otherwise noted.

EXAMPLE I

This example illustrates the preparation of a cationic starch dispersion in accordance with the process of this invention.

One hundred and twenty parts of potato starch was slurried in 1,880 parts of water containing 4.8 parts of sodium hydroxide. To this slurry there was added 4.8 parts of the hydrochloride salt of beta-diethyl aminoethylchloride. Thereafter the resultant mixture was passed through a continuous cooker which was adjusted to raise the temperature of the contents to about 150° C. at a flow rate of 100 milliliters per minute. These conditions allowed dispersion of the starch as well as its reaction with the beta-diethylaminoethylchloride. The resulting cationic dispersion, Composition A, which was discharged from the continuous cooker had a solids content of 6%, by weight, a final pH of 11.1 and a degree of substitution (D.S.) of about 0.014.

In a repetition of the above described procedure, both the hydrochloride salt of hexamethyleneiminoethylchloride and diallyl cyanamide, respectively, were each reacted with the starch in identical proportions to the diethylaminoethyl chloride employed above. The resulting dispersions, Compositions B and C, respectively, exhibited a solids content and final pH comparable to the dispersion described above. The D.S. of the dispersion prepared with the hexamethyleneiminoethylchloride was about 0.02 while the D.S. of the dispersion prepared with the diallyl cyanamide was about 0.01.

In order to determine the effectiveness of these dispersions as pigment retention aids, each of the above described liquid cationic starches was added to the headbox during the normal course of a conventional papermaking process. In each case, the reaction product was added in a concentration of 0.25% by weight, based on the solids content of the starch product with respect to the dry weight of the dispersed pulp. The cellulose pulp also contained 10%, by weight, of titanium dioxide, based on the dry weight of the pulp. The degree of pigment retention, i.e. the percent, by weight, of the initially added pigment that was present in the resulting paper sheets in which these derivatives were homogeneously dispersed, was then determined by ashing the paper and weighing the resulting ash.

The following table presents the data obtained.

TABLE I

| Starch dispersion | Starch solids, percent added | Percent retention of titanium dioxide | |
|---|---|---|---|
| | | pH 7.6 | pH 6.0[1] |
| Composition A | 0.25 | 62 | 78 |
| Composition B | 0.25 | 69 | 78 |
| Composition C | 0.25 | 57 | 71 |
| Control (untreated potato starch)[2] | 0.25 | 31 | 58 |
| Blank (no added starch)[2] | 0 | 20 | 45 |

[1] Acidity was adjusted with aluminum sulfate.
[2] The data for the control and blank were obtained from a series of determinations.

Thus, the above data clearly demonstrate the improved pigment retention which is achieved by the use of the starch dispersions of this invention.

EXAMPLE II

This example illustrates the preparation of a modified starch dispersion wherein the base starch had previously been derivatized to contain phosphate groups.

About 60 parts of a commercially available corn starch phosphate (D.S. 0.007 with respect to phosphate) was suspended in 1,870 parts of water. To this suspension was added 80 parts of an aqueous solution of sodium hydroxide containing 3% sodium hydroxide, by weight, followed by the addition of 4 parts of beta-diethylaminoethylchloride.HCl. The resultant mixture was thereafter passed through a continuous cooker which was adjusted to raise the temperature of the contents to about 130–135° C. at a flow rate of 90–100 milliliters per minute. The resulting cationic dispersion, Composition A, which was discharged from the cooker had a solids content of 2.4%, by weight, pH of 11.2 and a degree of substitution of 0.013 with respect to the group introduced with the diethylaminoethylchloride.

Without delay, the thus-prepared dispersion without purification was directly added to bleached sulfite pulp at a concentration of 0.25%, by weight, on a solids on solids basis, for pigment retention evaluation and also added to bleached kraft at a concentration of 0.5, 1.0 and 1.5%, by weight, on a solids on solids basis, for strength evaluation. The bleached sulfite pulp contained 10%, by weight, of titanium dioxide, based on the weight of the dry pulp, and the test was carried out as described in the previous example. The strength evaluation was carried out by means of the Mullen Factor Test for burst strength. Paper sheets prepared using a commercially available cationic starch of the prior art (which also contained anionic phosphate groups and was prepared in accordance with Example I of U.S. Pat. 3,459,632— D.S. 0.03 with respect to the cationic groups and D.S. 0.007 with respect to the anionic groups) as well as paper sheets using no starch were also tested for comparison purposes.

The following table presents the data obtained.

TABLE II

| Starch dispersion | Percent retention of titanium dioxide | | | Mullen factor (lbs./inch²) | | | |
|---|---|---|---|---|---|---|---|
| | pH 7.6 | pH 6.0 | pH 4.6 | 0.0% | 0.5% | 1.0% | 1.5% |
| Composition A | 52 | 77 | 63 | | 1.35 | 1.40 | 1.48 |
| Cationic starch of prior art | 56 | 75 | 57 | | 1.39 | 1.49 | 1.49 |
| Blank (no added starch) | 37 | 44 | 45 | 1.27 | | | |

The above procedure was substantially repeated with two exceptions: the sodium hydroxide employed above was replaced with 9.6 parts of disodium hydrogen phosphate and the beta-diethylaminochloride.HCl was replaced with 2.4 parts of isatoic anhydride. The resulting cationic starch dispersion which was discharged from the cooker had a solids content of 7.2%, by weight, pH of 7.8 and a degree of substitution of 0.017.

EXAMPLE III

This example illustrates the preparation of additional starch dispersions in accordance with the process of this invention.

(A) One hundred and fifty parts of corn starch was suspended in 3,000 parts of water containing 1.6 parts of sodium hydroxide. To this slurry there was added 6.3 parts of cyanamide ($H_2NCN$) and the resultant mixture was thereafter passed through a continuous cooker which was adjusted to raise the temperature of the contents to about 110° C. at a flow rate 110 milliliters per minute. The resulting cationic dispersion which was discharged from the continuous cooker had a pH of 11, a solids content of about 5%, by weight, and a D.S. of about 0.06.

In a series of repetitions of the above procedure, the cyanamide reagent used therein was replaced, respectively, in equal amount, with:

(B) N-benzyl-N-methyl-aminoethyl chloride,
(C) chloromethyl pyrrolidine,
(D) chloroethyl piperidine,
(E) ethyleneimine,
(F) bromopropylamine,
(G) chloroethyl morpholine,
(H) glycidyl cyclohexylamine,
(I) triethylglycidyl ammonium chloride, and
(J) beta-chloroethylmethyl sulfonium iodide.

All of the reactions yielded modified starch dispersions wherein the D.S. varied over a range of from 0.008 to 0.03. On testing of these modified starch dispersions as described in the previous example, satisfactory results with respect to percent retention and Mullen Factor values were obtained in each case.

EXAMPLE IV

This example illustrates the preparation of additional modified starch dispersions in accordance with the process of this invention.

One hundred parts of corn starch was suspended in 195 parts of water. To this mixture there was added 10 parts of cyanamide ($H_2NCN$) and the resultant slurry was pumped into a mixing chamber of the continuous cooker where it was combined with additional water and an aqueous solution of sodium hydroxide in such proportions as to result in a slurry having a solids concentration of about 5%, by weight, and a pH of 10.5. The resultant slurry was thereafter pumped through the cooker in normal manner at temperatures and pressures as described:

Sample A at 215° F. and 10 p.s.i.
Sample B at 250° F. and 25 p.s.i.
Sample C at 300° F. and 65 p.s.i.

The resultant modified dispersions exhibited the following degrees of substitution:

Sample A—D.S. 0.029
Sample B—D.S. 0.031
Sample C—D.S. 0.018

Satisfactory percent retention and Mullen Factor values were obtained with each of the samples of these modified starch dispersions.

Summarizing, it is seen that this invention provides a novel continuous process for the preparation of derivatized starch dispersions. It is now possible to prepare dispersions of modified starches having a low solids content which is particularly useful in connection with the manufacture of paper, said dispersions being employed as additives in such manufacture without isolation or purification.

This is further illustrated in the drawing. In the flow diagram:

In the tank I (A) there is prepared a starch slurry (2–44%) which is pumped via the pump (B) into the cooker (C). Prior to entering the cooker (C), the starch is mixed with catalyst and reagent via the metering pumps (D, E) from the container (F, G) and, if need be, diluted to the required concentration (2–15%). From C the starch emerges completely dissolved and modified. It is either collected in the holding tank II (H) where it may be further diluted or H is bypassed. Finally the modified starch solution is pumped (I) to the pulp stream (J) and the paper machine (K) wherefrom it emerges with the paper.

What is claimed is:

1. A process for preparing a dispersion of a modified starch which comprises continuously and simultaneously gelatinizing and reacting a starch in an aqueous reaction medium having a pH of 8 or higher at a temperature of at least 100° C., with a monofunctional reagent to introduce cationic substituent groups into the starch, said substituent groups being selected from the group consisting of primary amine, secondary amine, tertiary amine, quaternary ammonium, pseudourea, phosphonium, sulfonium, cyclic amino and cyclic imino groups; wherein the concentration of starch in the aqueous reaction medium is from about 1 to 15%, by weight, based on the weight of aqueous reaction medium.

2. The process of claim 1, wherein the monofunctional reagent is present in the aqueous reaction medium in a concentration of from about 2 to 20 parts per 100 parts of starch, by weight.

3. The process of claim 1, wherein the starch present in the aqueous reaction medium contains anionic groups.

4. The process of claim 1, wherein the starch is present in the aqueous reaction medium in a concentration of from 2 to 10%, by weight, based on the weight of the aqueous reaction medium.

5. The process of claim 4, wherein the monofunctional reagent is the hydrochloride salt of beta-diethylaminoethylchloride.

6. The process of claim 4, wherein the monofunctional reagent is cyanamide.

7. The process of claim 4, wherein the monofunctional reagent is beta-chloroethylpiperidine.

References Cited

UNITED STATES PATENTS

| | | | |
|---|---|---|---|
| 3,553,194 | 1/1971 | Verbanac | 260—233.3 R |
| 2,989,520 | 6/1961 | Rutenberg | 260—233.3 R |
| 3,135,738 | 6/1964 | Cushing | 127—70 X |
| 3,243,426 | 3/1966 | Caesar | 260—233.3 R |
| 3,251,826 | 5/1966 | Mehltretter | 260—233.3 R |
| 3,378,547 | 4/1968 | Patel | 260—233.3 R |
| 3,448,101 | 6/1969 | Billy | 260—233.3 R |
| 3,459,632 | 8/1969 | Caldwell | 162—175 |
| 3,578,475 | 5/1971 | Alexander | 260—233.3 R |
| 3,666,751 | 5/1972 | Jarowenko | 106—213 X |

MORRIS O. WOLK, Primary Examiner

S. MARANTZ, Assistant Examiner

U.S. Cl. X.R.

127—70; 162—175; 260—233.3 R

United States Patent Office 3,721,576
Patented Mar. 20, 1973

3,721,576
MARK FORMING RECORD MATERIALS AND
PROCESS FOR THEIR USE
Sheldon Farber and Arthur John Wright, Dayton, Ohio, assignors to The National Cash Register Company, Dayton, Ohio
No Drawing. Original application Nov. 3, 1970, Ser. No. 86,642, now Patent No. 3,642,827. Divided and this application Oct. 1, 1971, Ser. No. 185,828
Int. Cl. B41m 5/22
U.S. Cl. 117—36.2          13 Claims

ABSTRACT OF THE DISCLOSURE

A pressure-sensitive record unit and a mark-forming unit are disclosed which employ a chromogenic material of normally colorless form having the structural formula:

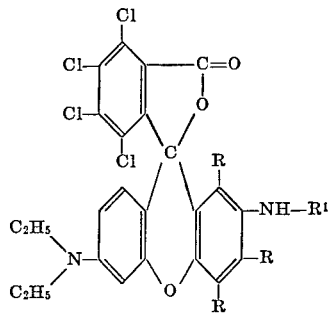

wherein R is hydrogen, an alkyl radical having 1 to 4 carbon atoms per R group or chlorine and $R^1$ is hydrogen, an alkyl radical having 1 to 4 carbon atoms per $R^1$ group or phenyl.

---

This is a division of application Ser. No. 86,642, filed Nov. 3, 1970 now U.S. Pat. 3,642,827.

This invention relates to colorless, but colorable fluoran dyes for use in pressure sensitive record material. More specifically, this invention relates to tetrahalo-fluoran dyes.

Throughout this application, it is to be understood that the fluoran dyes are substantially colorless until reacted with an acidic material.

Heretofore, some of the pressure sensitive, mark-forming systems of the prior art employed fluoran dyes which are substantially colorless in form when in liquid solution, but which are connected to colored forms upon reactive contact with acidic material. Often, there are problems with the intensity and hue of these colored forms. For example, color instability on exposure to light frequently occurs.

Colorless, but colorable tetrahalo-fluoran dyes now have been found. The tetrahalo-fluoran dyes of this invention have improved lightfastness qualities, i.e., improved fade resistance.

Pressure sensitive, mark-forming systems of the prior art include a marking system of disposing on or within sheet support material, mutually reactant but unreacted mark-forming components and a liquid solvent in which each of the mark-forming components is soluble. The liquid solvent is present in such form that it is maintained isolated by a pressure rupturable barrier from at least one of the mark-forming components until an application of pressure causes a breach or rupture of the barrier in the area delineated by the pressure pattern. The mark-forming components thereby are brought into reactive contact, producing a distinctive mark.

The tetrahalo-fluoran dyes of this invention having chromogenic properties can be incorporated in a web or coated onto the surface of a web to provide a manifolding unit, which is useful in carrying out methods of marking involving reactive contact with color activating material to yield colored reaction products in areas where marking is desired.

The colorless, but colorable tetrahalo-fluorans of this invention are represented by the formula:

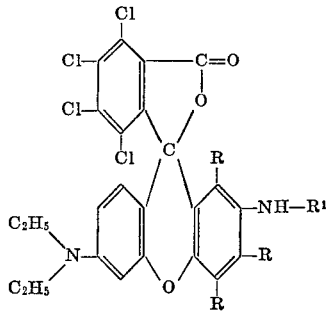

wherein R is hydrogen, an alkyl radical having 1 to 4 carbon atoms per R group or chlorine and $R^1$ is hydrogen, an alkyl radical having 1 to 4 carbon atoms per $R^1$ group or phenyl.

Specific examples are where:

|   | R   | $R^1$ | R   | R  |
|---|-----|------|-----|----|
| 1 | H   | CH₃  | H   | H  |
| 2 | H   | H    | H   | H  |
| 3 | CH₃ | H    | CH₃ | H  |
| 4 | H   | ⌬    | H   | H  |
| 5 | CH₃ | H    | H   | CH |

The tetrahalo-fluorans of this invention can be produced by any method known in the prior art. Generally, tetrachloro-phthalic anhydride is reacted with a diethylamino phenol to give tetrachloro-benzoic acid. This is then reacted with a phenol or naphthalene in the presence of sulfuric acid to yield the desired fluoran. Prior art processes are described in U.S. Pat. 3,501,331 and Beilsteins Handbuch Der Organischem Chemie, copyright 1934 by Julius Springer in Berlin, volume XIX, pages 348–349.

A composition of matter is disclosed which comprises a colored product of chemical reaction having a resonant chemical structure and produced by contact of a color-activating material with one of the above-mentioned chromogenic compounds. The color-developing or activating material is an acidic substance useful for converting the chromogenic compounds to colored forms.

The method of marking of this invention, i.e., the method of developing a colored material from substantially colorless or slightly colored chromogenic compounds, comprises providing a chromogenic compound selected from among the above-mentioned compounds and bringing such chromogenic compound into reactive contact with an acidic color-activating substance, in areas where marking is desired, to produce a colored form of the chromogenic compound by the action thereupon of the acidic substance.

Acidic materials employed in this invention can be any compound within the definition of a Lewis acid, i.e., any electron acceptor. Preferably, acidic organic polymers such as phenolic polymers are employed as the acidic material. The novel chromogenic materials exhibit the advantage of improved color stability when they are reacted with such phenolic polymers. Solution formation of solid particles of the polymeric material in a solvent system with the substantially colorless chromogenic compounds permits penetration of the colored reaction product into a porous support sheet, e.g., paper, so that the colored form of the chromogenic material is absorbed into the body of the sheet and is not merely on the surface of the sheet. The absorption feature provides protection against erasure of recorded data by attrition of the surface of a record sheet.

In a two-sheet unit, the bottom surface of the overlaying sheet is supplied on the surface or near the surface with a multiplicity of minute pressure-rupturable microcapsules containing a solution of the substantially colorless, chromogenic component. An acidic component, such as an acid clay or a phenolic polymeric material lies within the lower web or undersheet or upon the upper surface of the lower web or undersheet. A colored mark is made by the use of a stylus, a type character, or other pressure-exerting means applied to the two-sheet unit manifold.

The encapsulated solution is released on the event of rupture of the capsules in writing operations. The released solution is transferred from the overlying or base-sheet to the receiving surface of the underlying sheet in conformance with the pressure pattern of the writing operation. The top of the underlying sheet is coated or impregnated with a material reactant with the chromogenic material, e.g., an acid clay or an acidic phenolic polymer material; and capsules are present on the overlying or base-sheet which capsules contain a liquid solution of chromogenic material. In another embodiment of the record material, the capsules can contain the polymeric phenolic material in liquid solution and the receiving surface of the underlying sheet can be supplied with the chromogenic material.

It is possible to incorporate the chromogenic material in a solid, crystalline state in a binder material so that the chromogenic material can be transferred from the overlying sheet, upon the application of pressure, to deposit some of the chromogenic material on the receiving surface of the undersheet, which receiving surface carries a color-activating polymeric material. Preferably, the chromogenic substance is dissolved in an appropriate solvent and minute droplets of the solution of the chromogenic material are encapsulated in minute, rupturable, capsules. It is apparent that many other arrangements are possible, including different configurations and relationships of the solvent and all of the mark-forming materials with respect to their encapsulation and location on the supporting underlying or overlying sheets or webs can be envisioned. Such arrangements are thoroughly described in U.S. Pat. 3,672,935.

The polymeric mark-forming components have a common solubility with the novel chromogenic material in at least one liquid solvent when the acid-reacting material is a phenolic or other acidic organic polymer. In a single system, several chromogenic materials can be used with the same or different polymeric materials. Several polymeric materials can be reactively contacted with a single chromogenic compound or with a mixture of chromogenic compounds.

The solvent can be maintained in physical isolation in minute droplets until such time as it is released by application of pressure. This may be accomplished by several known techniques, but, preferably, isolation is maintained by encapsulation of individual droplets of the solvent in a microcapsule according to the procedures desecribed, for example, in United States Patent No. 2,712,507, issued July 5, 1955 on the application of Barrett K. Green; 2,730,457, issued Jan. 10, 1956 on the application of Barrett K. Green and Lowell Schleicher; 2,800,457, issued July 23, 1957 on the application of Barrett K. Green and Lowell Schleicher; 2,800,458, issued July 23, 1957 on the application of Barret K. Green, re-issued as Reissue Patent No. 24,899 on Nov. 29, 1960; and 3,041,289, issued June 26, 1962 on the application of Bernard Katchen and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules, in addition to being pressure rupturable, are inert or unreactive with respect to the intended contents of the capsules and the other-mark forming components so that the capsule wall material remains intact under normal storage conditions until such time as it is released by an application of marking pressure. Preferred examples of eligible capsule wall materials include gelatin, gum arabic and many others thoroughly described in the aforementioned patents.

For most uses in record material, the capsule size does exceed about 50 microns in diameter. Preferably, the capsules are smaller than about 15 microns in diameter.

The acidic organic polymeric material useful for developing the color of novel chromogenic compounds in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylether-maleic anhydride copolymer and mixture thereof.

More specifically, phenol polymers found useful include alkyl-phenol acetylene resins, which are soluble in common organic solvents and possess permanent fusibility in the absence of being treated by cross-linking materials. Another specific group of useful phenolic polymers are members of the type commonly referred to as "novolacs" (a type of phenol-formaldehyde polymeric material) which are characterized by solubility in common organic solvents and which are, in the absence of cross-linking agents, permanently fusible. Resol resins, if they are still soluble, can be used, though they are subject to change in properties upon aging. Generally, phenolic polymer material found useful in practicing this invention is characterized by the pressure of hydroxyl groups and by the absence of groups such as methylol, which tend to promote infusibility or cross-linking of the polymer, and, further, by being soluble in organic solvents and relatively insoluble in aqueous media. Mixtures of these organic polymers and other acidic materials can be employed.

A laboratory method useful in the selection of suitable phenolic resins is the determination of the infrared absorption pattern. It has been found that phenolic resins which undergo absorption in the 3200–3500 cm.$^{-1}$ region (which is indicative of hydroxyl groups) on the resin molecules and which do not absorb in the 1600–1700 cm.$^{-1}$ region are eligible. This latter absorption region is indicative of desensitization of hydroxyl groups which desensitization renders such groups unavailable for reaction with the chromogenic materials.

The preparation of some organic polymeric materials useful for practicing this invention has been described in "Industrial and Engineering Chemistry," volume 43, pages 134 to 141, January 1951, and a particular polymer thereof is described in Example I of United States Patent No. 2,052,093, issued to Herbert Hönel on Aug. 25, 1936. The preparation of the phenol-acetylene polymers has been described in "Industrial and Engineering Chemistry," volume 41, pages 73 to 77, January 1949. The preparation of maleic anhydride copolymers is described in the literature, such as, for example, one of the maleic anhydride vinyl copolymers, as disclosed in "Vinyl and Related Polymers," by Calvin E. Schildknecht, second printing, published April 1959, by John Wiley & Sons, Incorporated: See pages 65 to 68 (styrene-maleic anhydride copolymer), 530 to 531 (ethylene-maleic anhydride copolymer), and 628 to 630 (vinylmethylether-maleic anhydride copolymer).

When the acidic material used as a mark-forming component in the present invention is one of the aforementioned organic polymers, the liquid solvent is chosen so as to be capable of dissolving it. The soivent can be volatile